(12) United States Patent
Tippy et al.

(10) Patent No.: US 9,880,382 B1
(45) Date of Patent: Jan. 30, 2018

(54) EXTERIOR VEHICLE CAMERA PROTECTION AND CLEANING MECHANISMS

(71) Applicant: Ford Global Technologies, LLC, Dearborn, MI (US)

(72) Inventors: David James Tippy, Ann Arbor, MI (US); Steven Yellin Schondorf, Dearborn, MI (US); Mahmoud Yousef Ghannam, Canton, MI (US)

(73) Assignee: Ford Global Technlogies, LLC, Dearborn, MI (US)

( * ) Notice: Subject to any disclaimer, the term of this patent is extended or adjusted under 35 U.S.C. 154(b) by 0 days.

(21) Appl. No.: 15/099,117

(22) Filed: Apr. 14, 2016

(51) Int. Cl.
*G02B 27/00* (2006.01)
*B60R 11/04* (2006.01)
*G03B 11/04* (2006.01)

(52) U.S. Cl.
CPC .......... *G02B 27/0006* (2013.01); *B60R 11/04* (2013.01); *G03B 11/048* (2013.01); *B60R 2300/802* (2013.01)

(58) Field of Classification Search
CPC .............................. G02B 27/006; B60R 11/04
USPC ................... 359/507, 508, 509, 511; 15/97.1
See application file for complete search history.

(56) References Cited

U.S. PATENT DOCUMENTS

| 7,800,682 | B2 * | 9/2010 | Nagamine | H04M 1/0264 348/335 |
|---|---|---|---|---|
| 8,118,501 | B2 | 2/2012 | Buschmann | |
| 8,567,963 | B1 * | 10/2013 | Criscuolo | G02B 27/0006 359/507 |
| 8,753,025 | B2 | 6/2014 | Suman et al. | |
| 9,602,703 | B1 | 3/2017 | Raphael | |
| 2002/0139394 | A1 * | 10/2002 | Bronson | B08B 17/02 134/6 |

(Continued)

FOREIGN PATENT DOCUMENTS

| CN | 206141507 U | 5/2017 |
|---|---|---|
| DE | 102005021670 A1 | 11/2006 |

(Continued)

OTHER PUBLICATIONS

Dan Mihalascu, *Nissan Debuts Intelligent Self-Cleaning Rear View Camera on New Note*, Carscoops, Jun. 14, 2013 (2 Pages).

(Continued)

*Primary Examiner* — Ricky D Shafer
(74) *Attorney, Agent, or Firm* — James P. Muraff; Neal, Gerber & Eisenberg LLP

(57) ABSTRACT

A vehicle camera protection and cleaning system is disclosed in which at least one wiper is positioned on an underside surface of a camera cover to clean a lens of a vehicle camera. In one embodiment, the system includes an inner ring fixedly attached to an underside surface of the cover, and a plurality of aperture members pivotally connected to the inner ring on one end and pivotally connected on another end to an outer gear that is movable relative to the inner gear, where at least one of the plurality of aperture members comprises a wiper configured to clean a lens of the camera when the aperture members are moved over the lens. In other embodiments, the wiper may be positioned on an underside surface of a cover of the camera that either rotates in a circular manner or translates over the lens of the camera.

20 Claims, 8 Drawing Sheets

(56) References Cited

U.S. PATENT DOCUMENTS

| | | | |
|---|---|---|---|
| 2011/0141562 A1* | 6/2011 | Okazawa | G02B 27/0006 |
| | | | 359/507 |
| 2011/0210151 A1 | 9/2011 | Weikert et al. | |
| 2012/0000024 A1* | 1/2012 | Layton | G03B 11/00 |
| | | | 15/97.1 |
| 2013/0086765 A1* | 4/2013 | Chen | G02B 27/0006 |
| | | | 15/250.001 |
| 2014/0020201 A1* | 1/2014 | Bunt | B08B 1/001 |
| | | | 15/250.31 |
| 2014/0247324 A1* | 9/2014 | Cury | H04N 7/183 |
| | | | 348/36 |
| 2015/0246660 A1* | 9/2015 | Seedall | B60S 1/26 |
| | | | 359/507 |

FOREIGN PATENT DOCUMENTS

| | | |
|---|---|---|
| DE | 102005021672 A1 | 11/2006 |
| DE | 102008027430 A1 | 2/2009 |
| GB | 2255539 A | 11/1992 |
| JP | 2001199492 A | 7/2001 |
| JP | 2015182656 A | 10/2015 |
| KR | 20110059055 A | 6/2011 |

OTHER PUBLICATIONS

Search Report dated Sep. 27, 2017, for GB Patent Application No. GB1705029.5 (5 pages).

* cited by examiner

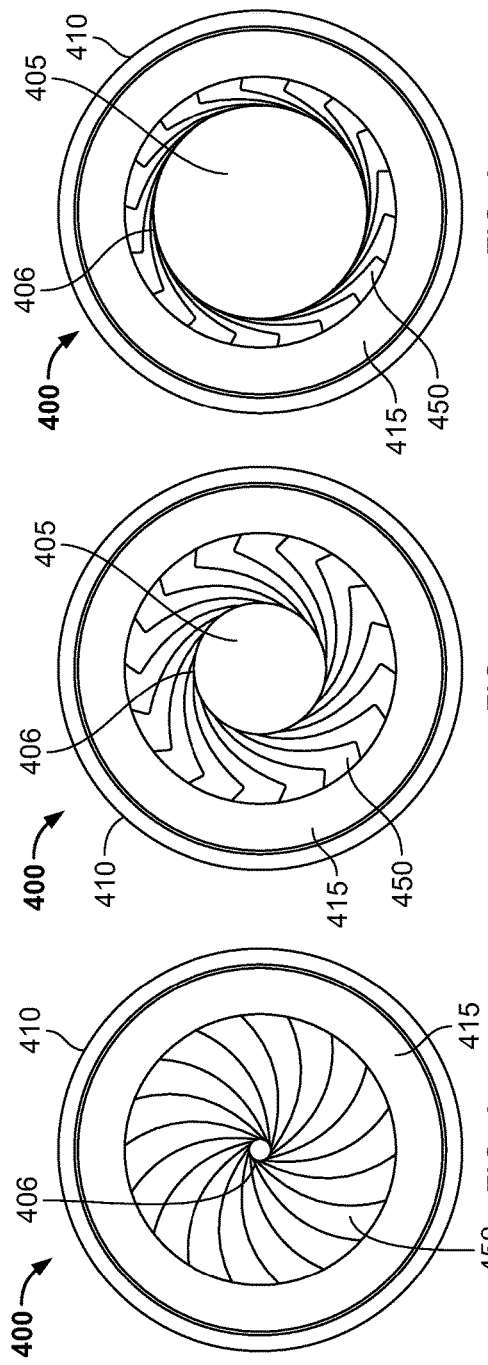
FIG. 4
FIG. 5
FIG. 6
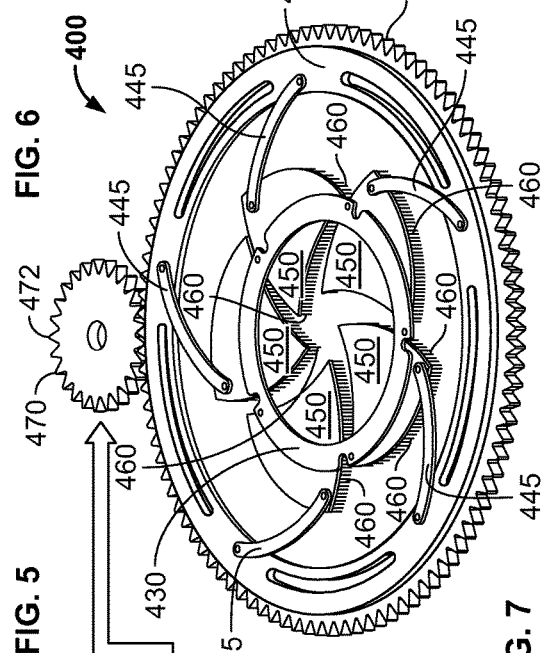
FIG. 7
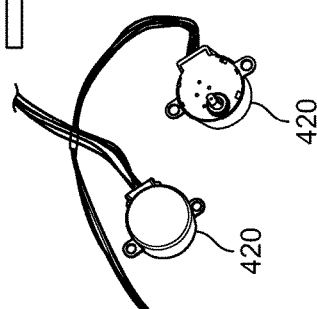

EXTERIOR VEHICLE CAMERA PROTECTION AND CLEANING MECHANISMS

BACKGROUND

This application relates generally to the field of camera protection and cleaning systems, and more particularly to systems and methods for protecting and cleaning external cameras mounted on a vehicle.

A Reversing Video Device (RVD) may be mounted on vehicles, such as an automobile, to assist a driver of the vehicle to avoid objects and people in the path of the vehicle when the vehicle is driven, such as in reverse. RVD systems may include a camera, such as a Rear View Camera (RVC), mounted on the vehicle to capture video of the scene surrounding the vehicle, and a video display unit mounted in the driver's line of sight to allow the driver to view the display when driving the vehicle.

Some mounting locations of a vehicle's camera, such as a rear view camera, may cause the camera's lens to collect dust, dirt, and debris, which may obscure the field of view of the camera. There exists a need, therefore, to provide a system that removes such dust, dirt, and debris to maintain the functionality of the camera or other externally facing device, such as a radar unit, while being easily accessible and maintainable by an owner of the vehicle.

SUMMARY

A vehicle camera protection and cleaning system is disclosed. In one embodiment, the system includes an inner ring fixedly attached to an underside surface of the cover, and a plurality of aperture members pivotally connected to the inner ring on one end and pivotally connected on another end to an outer gear that is movable relative to the inner gear, where at least one of the plurality of aperture members comprises a wiper configured to clean a lens of the camera when the aperture members are moved over the lens.

The wiper may include a brush. The wiper may include a plastic or a rubber. The wiper may include a plurality of wiping elements configured to sweep across the lens of the camera.

The system may include a controller including a processor and memory configured to control the movement of the aperture members to clean the camera lens. The controller may control the movement of the aperture members over a predetermined period of time. The controller may control the movement of the aperture members in a predetermined cycle.

The aperture members may be positioned side by side along a circumference of the inner ring. The system may include a motor configured to rotate the outer gear.

In another embodiment, a vehicle camera protection and cleaning system is disclosed comprising a camera cover, the system comprising a motor connected to the cover and configured to rotate the cover in a circular manner, an aperture defined by a plurality of walls in the cover, the aperture configured to provide an opening for the camera for viewing a vicinity around a vehicle, and a plurality of wipers positioned on an undersigned surface of the cover, the wipers configured to clean a lens of the camera when the cover is moved over the lens.

The wiper may include a brush. The wiper may include a plastic or a rubber. The wiper may include a plurality of wiping elements configured to sweep across the lens of the camera.

The system may include a controller including a processor and memory configured to control the movement of the aperture members to clean the camera lens. The controller may control the movement of the aperture members over a predetermined period of time. The controller may control the movement of the aperture members in a predetermined cycle.

In another embodiment, a vehicle camera protection and cleaning system is disclosed comprising a camera cover, the system comprising a motor connected to the cover and configured to translate the cover over the camera lens, at least one wiper positioned on an undersigned surface of the cover, the at least one wiper configured to clean a lens of the camera when the cover is translated over the lens, and a controller including a processor and memory connected to the motor, the controller configured to control the movement of the cover over the camera lens.

The wiper may include a brush. The wiper may include a plastic or a rubber. The wiper may include a plurality of wiping elements configured to sweep across the lens of the camera.

BRIEF DESCRIPTION OF THE DRAWINGS

FIG. 4 illustrates a plan view of an embodiment of a camera cleaning and protection system of the instant disclosure with the cover shown in a first position.

FIG. 5 illustrates another plan view of the embodiment shown in FIG. 4 with the cover shown in a second position.

FIG. 6 illustrates another plan view of the embodiment shown in FIG. 4 with the cover shown in a third position.

FIG. 7 illustrates a perspective view of the embodiment shown in FIG. 4 with the cover removed.

DETAILED DESCRIPTION

Figure 1A:
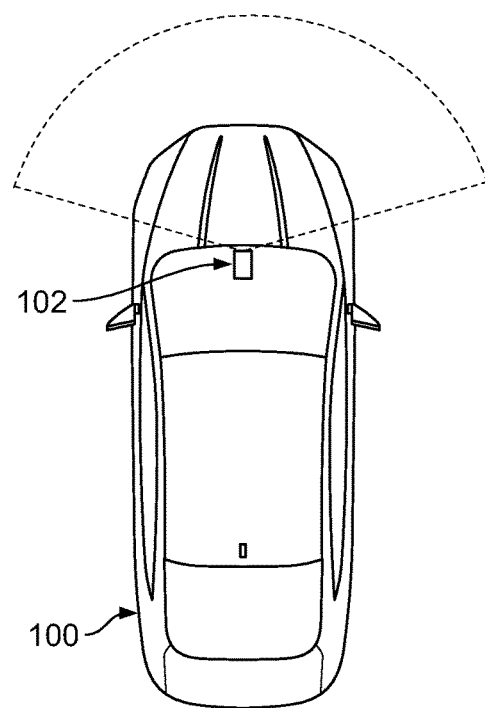
FIG. 1A illustrates a top view of a vehicle of the instant disclosure.

Although the figures and the instant disclosure describe one or more embodiments of a camera washing system, one of ordinary skill in the art would appreciate that the teachings of the instant disclosure would not be limited to these embodiments.

Turning now to the drawings wherein like reference numerals refer to like elements, there are shown exemplary embodiments and methods of a camera cleaning and protection system for a vehicle camera or other device that may collect dust, dirt, and/or debris for which cleaning may be useful.

Figure 1B:
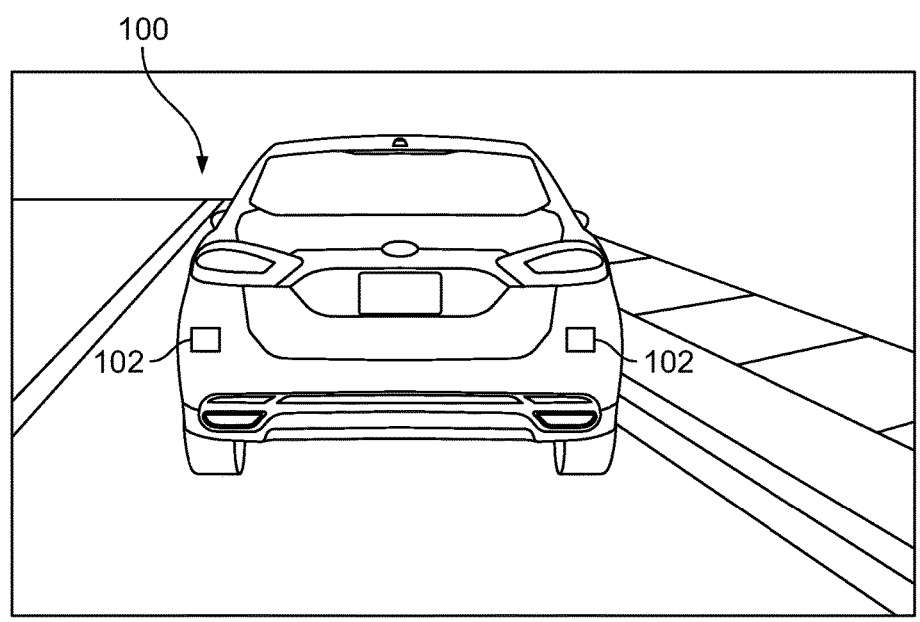
FIG. 1B illustrates a rear view of the vehicle shown in FIG. 1A.

FIGS. 1A-1B show vehicle 100 in accordance with one embodiment of the instant disclosure. In this embodiment, vehicle 100 is an automobile, though in other embodiments vehicle 100 may be any suitable vehicle (such as a truck, a watercraft, or an aircraft). Vehicle 100 may be a gasoline powered vehicle, a hybrid vehicle, an electric vehicle, a fuel cell vehicle, or any other type of suitable vehicle. Vehicle 100 may include standard features, such as a dashboard, adjustable seats, one or more batteries, an engine or motor, a transmission, an HVAC system including a compressor and electronic expansion valve, a windshield and/or one or more windows, doors, a rear view mirror, a right side view mirror, a left side view mirror, seatbelts, airbags, wheels, and tires.

Figure 2:
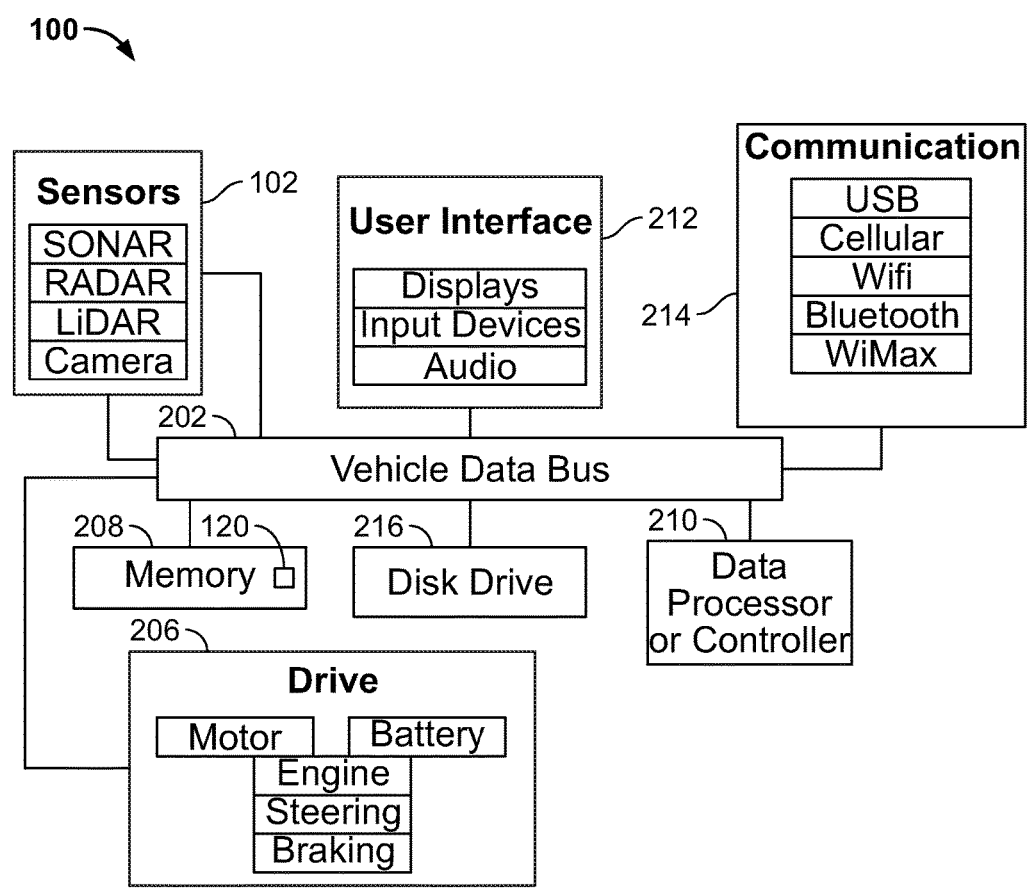
FIG. 2 illustrates a block diagram of exemplary components of the vehicle shown in FIG. 1A.

As shown in FIGS. 1A-1B and 2, vehicle 100 may include sensors 102, which may be arranged in and around the vehicle in a suitable fashion. Sensors 102 can all be the same or they can vary from one to the next. Sensors 102 may include many sensors or only a single sensor.

Certain of the sensors 102 may be configured to obtain data about the environment surrounding the vehicle (e.g., position sensors or weather sensors), as indicated by the dashed line in FIG. 1A, while others obtain data about components of the vehicle itself (e.g., gas level sensors or oil pressure sensors). The sensors 102 may be configured to transmit the data they obtain to one or more controllers of the vehicle 100, such as to controller 210 (described below), for further processing. The sensors 102 may include any suitable sensor or sensors such as, but not limited to: (1) infrared sensors; (2) visual sensors (such as cameras); (3) ultrasonic sensors; (4) RADAR; (5) LIDAR; (6) laser-scan sensors; (7) inertial sensors (for example, an inertial measurement unit); (8) wheel speed sensors; (9) road condition sensors (to directly measure certain road conditions); (10) rain sensors; (11) suspension height sensors; (12) steering wheel angle sensors; (13) steering torque sensors; (14) brake pressure sensors; (15) tire pressure sensors; or (16) vehicle location or navigation sensors (such as a Global Positioning System). Sensors 102 may include gear sensors configured to detect gear engagement of the vehicle's transmission, accelerometers configured to detect vehicle acceleration, speed sensors to detect vehicle speed, wheel speed, and/or steering wheel speed, torque sensors to detect engine or motor output torque, driveline torque, and/or wheel torque, and position sensors to detect steering wheel angular position, brake pedal position, and/or mirror position. Some sensors 102 may be mounted inside the passenger compartment of vehicle 100, around the exterior of the vehicle, or in the engine compartment of vehicle 100. At least one sensor 102 may be used to identify the vehicle's driver via facial recognition, speech recognition, or communication with a device, such as a vehicle key or mobile phone personal to the driver.

Sensors 102 may have an OFF state and various ON states. Vehicle 100, or a device operatively connected to the vehicle, may be configured to control the states or activity of the sensors. It should be appreciated that the term "internal sensors" includes all sensors mounted to the vehicle, including sensors that are mounted to an exterior of vehicle 100.

As shown in FIG. 2, in one embodiment, vehicle 100 includes a vehicle data bus 202 operatively coupled to sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM® Association, Long Term Evolution (LTE)™, or more); WMAX; Bluetooth; near field communication (NFC); WFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface.

The user interface 212 may include any suitable input and output devices. The input devices enable a driver or a passenger of vehicle 100 to input modifications or updates to information shown in, for example, a vehicle display. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers. It should be appreciated that the term pressing a button or feature also includes pressing or activating a virtual button or feature, such as using a mouse to click on an item on a display, or pressing a virtual button on a touch screen.

The disk drive 216 is configured to receive a computer readable medium. In certain embodiments, the disk drive 216 receives the computer-readable medium on which one or more sets of instructions. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

In one embodiment, the vehicle 100 includes a one or more computer programs or subprograms 120 stored in the memory 208. When executed by the processor, the one or more computer programs or subprograms generate or select instructions for other elements of the vehicle to perform. In various embodiments, the one or more computer programs or subprograms are configured to direct instructions to the user interface 212, the communication devices 214, the vehicle drive 206, the sensors 102, the processor 210, and any other component operatively connected to the vehicle data bus 202. It should be appreciated that vehicle 100 may be fully autonomous or partially autonomous.

Figure 3:
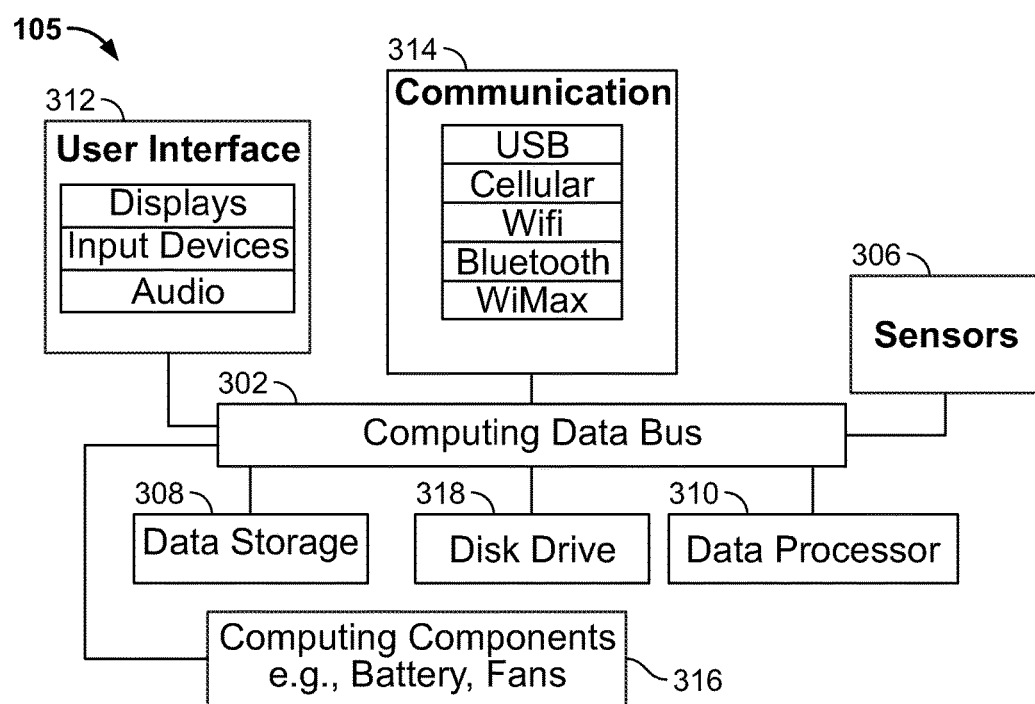
FIG. 3 illustrates a block diagram of an exemplary computing device operatively connected to the vehicle shown in FIG. 1A.

In various embodiments, a computing device 105 is operatively connected to the vehicle 100 via any suitable data connection such as WFi, Bluetooth, USB, or a cellular data connection. In one embodiment, shown in FIG. 3, the computing device 105 includes a data bus 302, operatively coupled to sensors 306, components 316, memory or data storage 308, a processor or controller 310, a user interface 312, and communication devices 314. It should be appreciated that the features of the computing device 105 may be similar to the features of the vehicle 100 as described above. For example, the communication devices 314 of the computing device 105 may operate similar to the communication devices 214 of the vehicle 100. The same applies to the user interface 312, the sensors 306, the data storage 308, the processor 310, and the disk drive 318. In various embodiments, the computing device 105 is a mobile phone or a server.

Turning to FIGS. 4-7, there is shown an exemplary camera cleaning and protection system 400 to wipe or clean a vehicle camera lens of a vehicle mounted or mountable camera. In this embodiment, camera protection and cleaning system 400 includes cover 410 comprising a cover housing 415, motor 420, inner ring 430 fixedly connected to an underside surface of cover housing 415, outer ring 440, shades 450 hingedly connected to inner ring 430 on one end and on another end to outer ring 440 via respective pivot members 445, one or more wipers 460 positioned on an underside of one or more shades 450, gear 470 configured to rotate outer ring 440, and an electronic controller (not shown) having a processor and memory configured to control the operation of motor 420. In some embodiments, camera protection and cleaning system 400 may include a sensor for detecting dirt or debris positioned on camera lens 405. In such embodiments, the sensor may include an optical sensor, a proximity sensor, or any other sensor configured to detect dirt or debris on camera lens 405. In this embodiment, although FIGS. 4-6 show at total of 18 shades 450, camera protection and cleaning system 400 may include any number of shades 450, such as the 5 shades 450 that are shown in FIG. 7, without departing from the instant disclosure.

The cover housing 415 includes an aperture 406, which permits an unobstructed view for the optics of the vehicle camera to capture the scene in the vicinity of vehicle 100. Cover housing 415 is configured to be detachably connected to the camera to easily remove and replace worn components of camera protection and cleaning system 400, including the one or more wipers 460.

The one or more wipers 460 may be configured as a brush having bristles, a squeegee, a pad, or any other configuration or combination that wipes away dirt and/or debris from the face of camera lens 405. In various embodiments, the one or more wipers 460 may be made from a nylon, a polyethylene, or other plastic, a naturally occurring fiber, a foam, an elastic and/or resilient material such as a rubber including natural rubber or a synthetic rubber, or any other material that serves the purpose of wiping away dirt and/or debris from the face of camera lens 405.

In this embodiment, gear teeth 472 of gear 470 are configured to be engaged with gear teeth 442 of outer ring 440. When commanded by a driver of vehicle 100 or automatically via the electronic controller, motor 420, which may be a stepper motor, may be configured to actuate and therefore cause rotation of gear 470. In so doing, gear 440 turns in the opposite direction of gear 470, causing shades 450 to move in unison in a spiral-like manner either to form aperture 406 over camera lens 405 or to close aperture 406 and therefore form a cover over camera lens 405. During the opening and closing movement of shades 450, the one or more wipers 460 may be configured to sweep across camera lens 405, thereby sweeping away dirt, debris or other impediments to viewing an image or scene through camera lens 405. FIG. 4, for example, shows aperture 406, which is defined by the position of shades 450, in a closed or mostly closed position. FIG. 6, by contrast, shows aperture 406, which is defined by a different position of shades 450, in an open or mostly open position. FIG. 5 shows a size of aperture 406 that lies between the size shown in FIGS. 4 and 6 during transit of shades 450 toward either a closed position or an open position.

In one embodiment, motor 420 is configured to rotate gear 470 in a pre-programmed pattern or sequence so as to repeatedly and at least partially open and close aperture 406 over camera lens 405 to repeatedly or sequentially sweep multiple wipers 460 back and forth over camera lens 405. In other embodiments, motor 420 is configured to rotate gear 470 in a pre-programmed pattern so as to either open or close the aperture over camera lens 405, and therefore, cause wipers 460 to sweep over camera lens 405 in a single pass. In other embodiments, wipers 460 may be commanded to make any number of passes over camera lens 405 to remove dirt or debris. In some embodiments, motor 420 is activated for a predetermined period of time, such as 5 seconds, 10 seconds, 20 seconds, or any other period of time, to cause wipers 460 to sweep over and clean camera lens 405. In yet other embodiments, a fluid, such as a cleaning fluid or a glass cleaner, may be dispensed, either manually or automatically, to aid in the dispersion and/or removal of dirt and/or debris from the surface of camera lens 405. In some embodiments, camera protection and cleaning system 400 may be configured to utilize the sensor to detect whether dirt or debris exists on the camera lens 405 to cease sweeping wipers 460 over camera lens 405 when the sensor no longer detects dirt or debris on the camera lens 405 or when the amount of dirt or debris detected on the camera lens 405 falls below a predetermined threshold.

Figure 10:
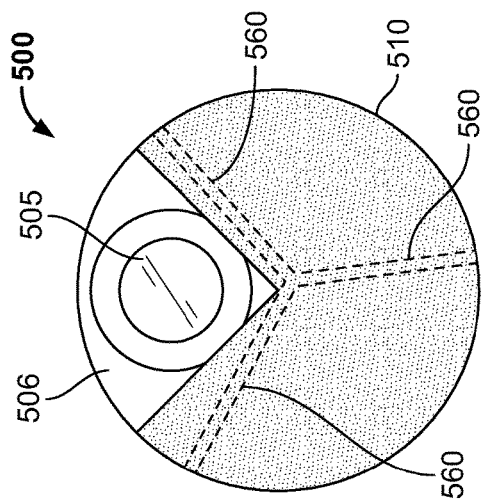
FIG. 10 illustrates another plan view of the embodiment shown in FIG. 8 with the cover shown in a third position.
Figure 9:
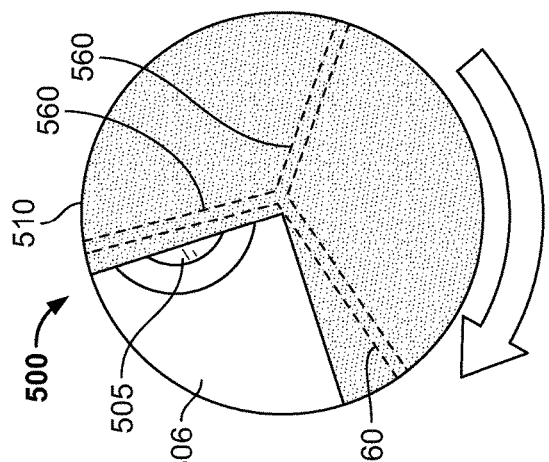
FIG. 9 illustrates another plan view of the embodiment shown in FIG. 8 with the cover shown in a second position.
Figure 11:
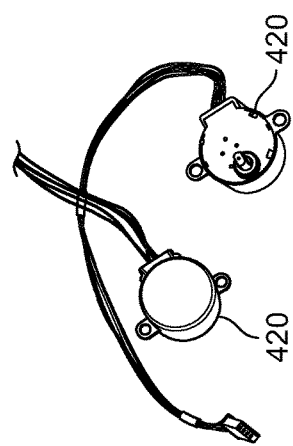
FIG. 11 illustrates a perspective view of an aspect of the embodiment shown in FIG. 8.
Figure 8:
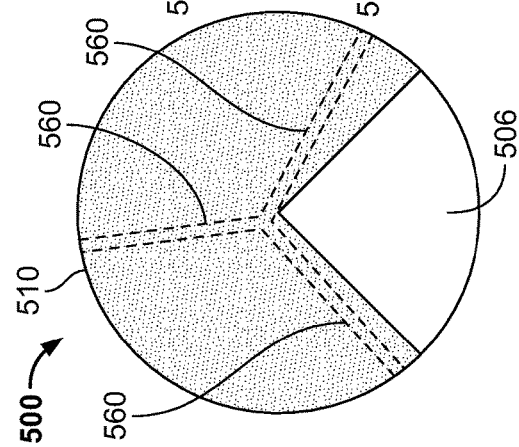
FIG. 8 illustrates a plan view of another embodiment of a camera cleaning and protection system of the instant disclosure with the cover shown in a first position.

Turning to FIGS. 8-11 there is shown another embodiment of a camera protection and cleaning system. In this embodiment, camera protection and cleaning system 500 includes cover 510 comprising a fixed aperture 506, motor 420, one or more wipers 560 positioned on an underside of the cover 510, and an electronic controller (not shown) having a processor and memory configured to control the operation of motor 420. Camera protection and cleaning system 500 may include a sensor for detecting dirt or debris positioned on camera lens 505. The sensor may include an optical sensor, a proximity sensor, or any other sensor configured to detect dirt or debris on the camera lens. In this embodiment, although FIGS. 8-10 show at total of 3 wipers 560, camera protection and cleaning system 500 may include any number of wipers 560.

The cover 510 includes an aperture 506, which permits an unobstructed view for the optics of the vehicle camera to capture the scene in the vicinity of vehicle 100 when the aperture 506 is positioned over the vehicle camera. Cover 510 is configured to be detachably connected to the camera to easily remove and replace worn components of camera protection and cleaning system 500, including the one or more wipers 560.

The one or more wipers 560 may be configured as a brush having bristles, a squeegee, a pad, or any other configuration or combination that wipes away dirt and/or debris from the face of camera lens 505. In various embodiments, the one or more wipers 560 may be made from a nylon, a polyethylene, or other plastic, a naturally occurring fiber, a foam, an elastic and/or resilient material such as a rubber including natural rubber or a synthetic rubber, or any other material that serves the purpose of wiping away dirt and/or debris from the face of camera lens 505.

In this embodiment, when commanded by a driver of vehicle 100 or automatically via the electronic controller, motor 420, which may be a stepper motor, may be configured to actuate and therefore cause rotation of cover 510 in either a clockwise or counter-clockwise direction. In so doing, the one or more wipers 560 are moved across camera lens 505 to sweep away dirt, debris or other impediments to viewing an image or scene through camera lens 405. The rotation of cover 510 may be commanded, for example, when a driver of vehicle 100 engages the reverse gear in the vehicle's transmission, which may trigger a controller request to open the aperture 506 of a vehicle backup camera.

In one embodiment, motor 420 is configured to rotate cover 510 in a pre-programmed manner so as to repeatedly or sequentially sweep multiple wipers 560 over camera lens 505. In one embodiment, wipers 560 are swept back and forth over camera lens 505. In other embodiments, wipers 560 are configured to rotate in either a clockwise or counter-clockwise direction across camera lens 505 for a predetermined period of time. In some embodiments, motor 420 is activated for a predetermined period of time, such as 5 seconds, 10 seconds, 20 seconds, or any other period of time, to cause wipers 560 to sweep over and clean camera lens 505. In some embodiments, wipers 560 may be caused to sweep over camera lens 505 in a single pass. In other embodiments, wipers 560 may be commanded to make any number of passes over camera lens 505 to remove dirt or debris. In yet other embodiments, a fluid, such as a cleaning fluid or a glass cleaner, may be dispensed, either manually or automatically, to aid in the dispersion and/or removal of dirt and/or debris from the surface of camera lens 505.

Figure 12:
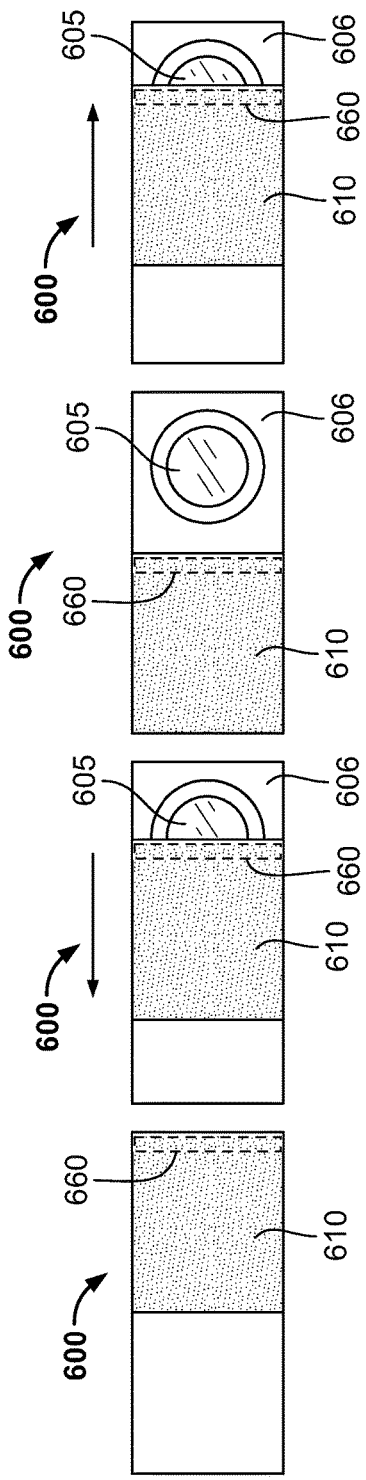
FIG. 12 illustrates a series of plan views of another embodiment of a camera cleaning and protection system of the instant disclosure with the cover shown in a first, second, third, and fourth position, respectively.
Figure 13:
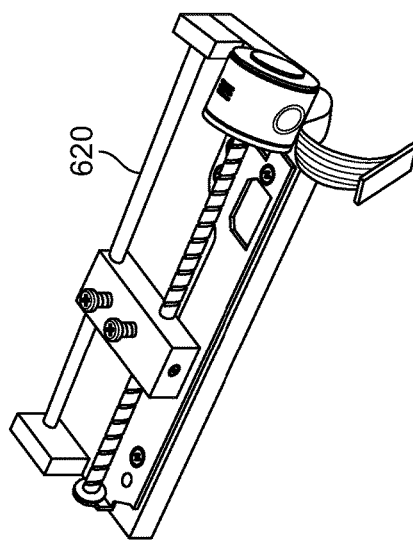
FIG. 13 illustrates a perspective view of an aspect of the embodiment shown in FIG. 12.

Turning to FIGS. 12-13 there is shown another embodiment of a camera protection and cleaning system. In this embodiment, camera protection and cleaning system 600 includes cover 610, motor 620, one or more wipers 660 positioned on an underside of the cover 610, and an electronic controller (not shown) having a processor and memory configured to control the operation of motor 4620. Camera protection and cleaning system 600 may include a sensor for detecting dirt or debris positioned on camera lens 605. The sensor may include an optical sensor, a proximity sensor, or any other sensor configured to detect dirt or debris on the camera lens. In this embodiment, although FIG. 12 shows only wiper 660, camera protection and cleaning system 600 may include any number of wipers 660.

The cover 610 is configured to form an aperture 606, which permits an unobstructed view for the optics of the vehicle camera to capture the scene in the vicinity of vehicle 100, when the cover 610 is positioned so as to reveal or expose the vehicle camera. Cover 610 is configured to be detachably connected to the camera to easily remove and replace worn components of camera protection and cleaning system 600, including the one or more wipers 660.

The one or more wipers 660 may be configured as a brush having bristles, a squeegee, a pad, or any other configuration or combination that wipes away dirt and/or debris from the face of camera lens 605. In various embodiments, the one or more wipers 660 may be made from a nylon, a polyethylene, or other plastic, a naturally occurring fiber, a foam, an elastic and/or resilient material such as a rubber including natural rubber or a synthetic rubber, or any other material that serves the purpose of wiping away dirt and/or debris from the face of camera lens 605.

In this embodiment, when commanded by a driver of vehicle 100 or automatically via the electronic controller, motor 620, which may be a linear motor, may be configured to actuate and therefore cause lateral or translational movement of cover 610. In other embodiments, cover 610 is configured to be retractably rolled up on a reel or roller to reveal the vehicle camera, and unrolled and extended to cover the vehicle camera when not in use. In these embodiments, the one or more wipers 660 are translatably moved across camera lens 605 to sweep away dirt, debris or other impediments to viewing an image or scene through camera lens 605. The movement of cover 610 may be commanded, for example, when a driver of vehicle 100 engages the reverse gear in the vehicle's transmission.

In one embodiment, motor 620 is configured to move or translate cover 610 in a pre-programmed manner so as to repeatedly or sequentially sweep one or more wipers 660 over camera lens 605. In one embodiment, wipers 660 are translated back and forth over camera lens 605. In other embodiments, wipers 660 are configured to translate across camera lens 505 for a predetermined period of time. In some embodiments, motor 620 is activated for a predetermined period of time, such as 5 seconds, 10 seconds, 20 seconds, or any other period of time, to cause wipers 660 to translate over and clean camera lens 605. In some embodiments, wipers 660 may be commanded to translate over camera lens 505 in a single pass. In other embodiments, wipers 560 may be commanded to make any number of passes over camera lens 605 to remove dirt or debris. In yet other embodiments, a fluid, such as a cleaning fluid or a glass cleaner, may be dispensed, either manually or automatically, to aid in the dispersion and/or removal of dirt and/or debris from the surface of camera lens 605.

Figure 14:
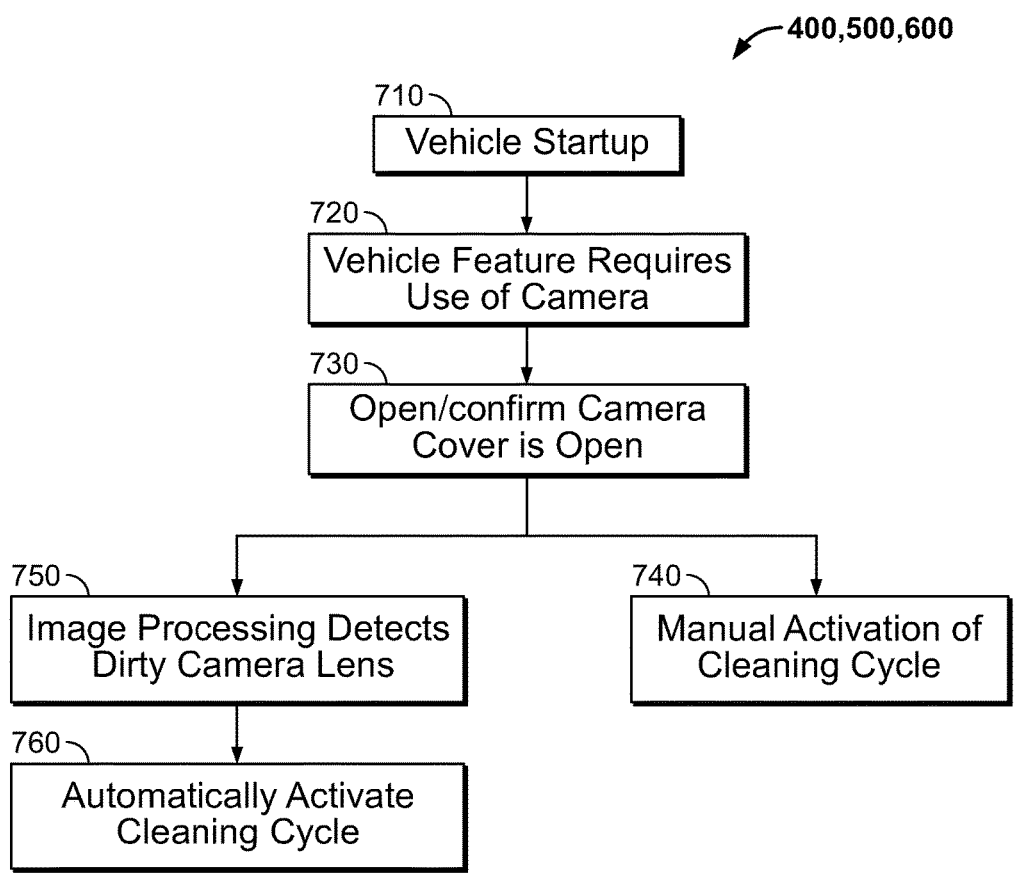
FIG. 14 illustrates a schematic view showing one or more modes of operation of a camera cleaning and protection system of the instant disclosure.

Turning to FIG. 14 there is shown an embodiment of a process for cleaning a vehicle camera lens. In this embodiment, on vehicle startup at step 710, one or more modules or systems of the vehicle 100 determines that one or more vehicle cameras should be activated, as shown at step 720. For example, when a driver of vehicle 100 engages the reverse gear in the vehicle's transmission, one or more electronic modules may trigger a controller to request activation of a camera. At step 730, camera protection and cleaning system 400,500,600 may be commanded by the controller to either open the camera cover (such as cover 410,510,610) or confirm that the camera cover is in an open position to expose the camera lens. At step 740, a driver of vehicle 100 may manually activate using, for example, a button or switch positioned within reach of the driver on the dashboard or console, if for example the driver determines that the camera lens appears dirty when viewing the scene in the vicinity of the vehicle on an electronic display. Once activated by a driver, camera protection and cleaning system 400,500,600 is configured to wipe away dirt or debris from the camera lens as disclosed above.

Steps 750 and 760 illustrate optional automatic operation of camera protection and cleaning system 400,500,600. At step 750, for example, camera protection and cleaning system 400,500,600 may be configured to detect whether the camera lens is dirty using an image processing system, which may include an imager or sensor as discussed above to detect a level of dirt or debris existing on the surface of the camera lens or a relative transparency or clarity of the lens.

Figure 15:
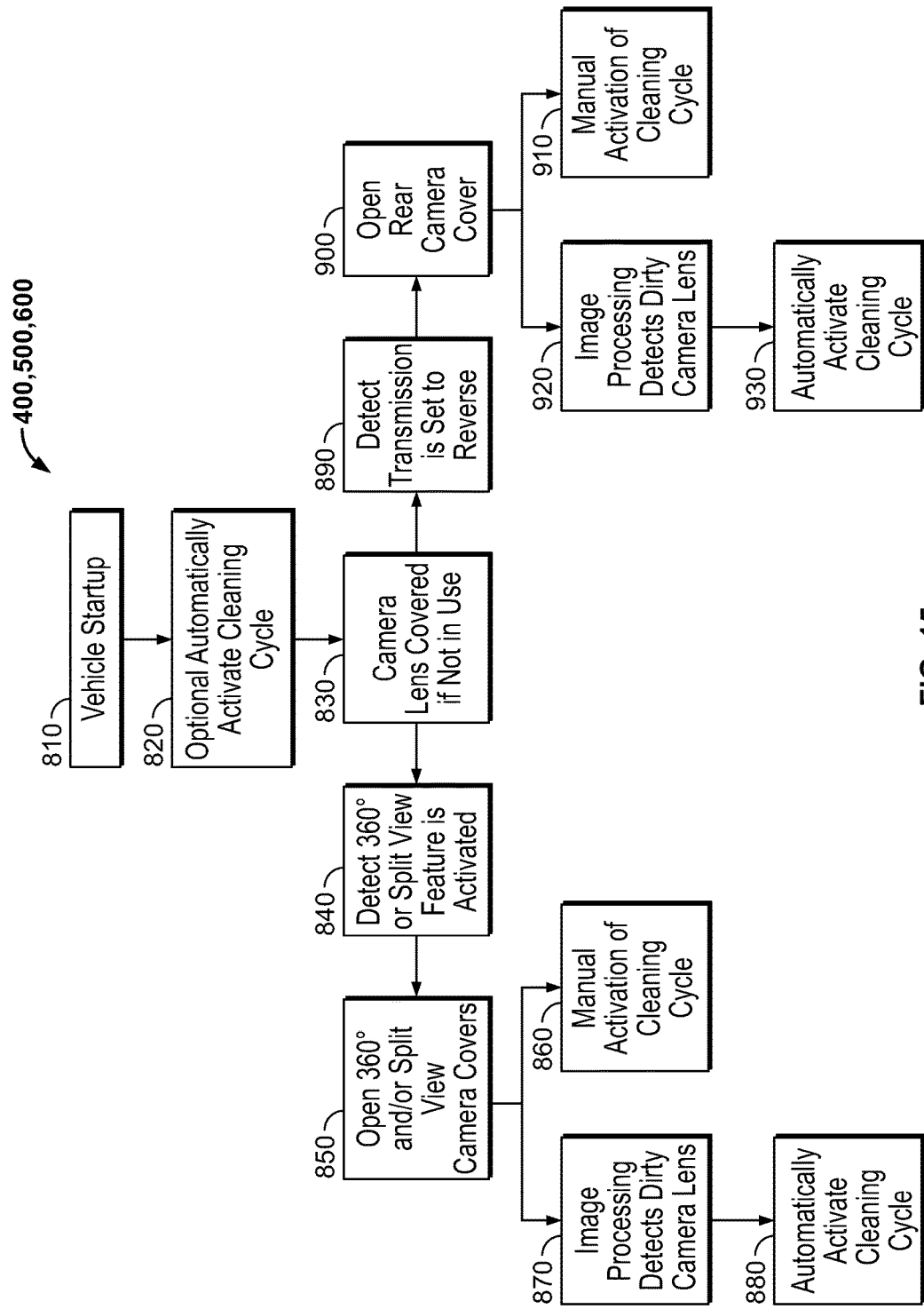
FIG. 15 illustrates another schematic view showing one or more modes of operation of a camera cleaning and protection system of the instant disclosure.

Turning to FIG. 15 there is shown another embodiment of a process for cleaning a vehicle camera lens. In this embodiment, on vehicle startup at step 810, camera protection and cleaning system 400,500,600 at step 820 may be configured to automatically initiate and complete a predetermined cleaning cycle of the camera lens. When the camera is not in use, the camera cover may be commanded to cover the camera lens to protect the lens from damage or debris, as shown at step 830.

In one aspect, when one or more modules of the vehicle 100 commands the operation of one or more vehicle 360° cameras or a split view cameras as shown at step 840, then camera protection and cleaning system 400,500,600 may be configured at step 850 to command the opening of one or more camera covers that may be covering the lens of the one or more 360° cameras or a split view cameras. If a driver at step 860 determines that the scene in the vicinity of the vehicle is obscured when viewing on an electronic display, the driver may manually activate camera protection and cleaning system 400,500,600 to initiate and complete a cleaning cycle of the camera lens.

Alternatively, steps 870 and 880 illustrate optional automatic operation of camera protection and cleaning system 400,500,600. At step 870, for example, camera protection and cleaning system 400,500,600 may be configured to detect whether the camera lens is dirty using an image processing system, which may include an imager or sensor as discussed above to detect a level of dirt or debris existing on the surface of the camera lens or a relative transparency or clarity of the lens. If the dirtiness of the camera lens exceeds a predetermined threshold, at step 880, camera protection and cleaning system 400,500,600 may be configured to initiate a predetermined cleaning cycle of the camera lens. In such instances, the cycle may include a predetermined cleaning sequence, a predetermined period of time of operation, or both.

In other embodiments, the camera protection and cleaning system 400,500,600 may be configured to either detect or receive a signal indicative of a driver engaging a transmission gear, such as a reverse gear, as shown at step 890. In that event, camera protection and cleaning system 400,500,600 may be configured at step 900 to command the opening of one or more camera covers that may be covering the lens of the one or more rear view cameras. If a driver at step 910 determines that the scene in the vicinity of the vehicle is obscured when viewing the scene on an electronic display, the driver may manually activate camera protection and cleaning system 400,500,600 to initiate and complete a cleaning cycle of the camera lens.

Alternatively, steps 920 and 930 illustrate optional automatic operation of camera protection and cleaning system 400,500,600. At step 920, for example, camera protection and cleaning system 400,500,600 may be configured to detect whether the rear view camera lens is dirty using an image processing system, which may include an imager or sensor as discussed above to detect a level of dirt or debris existing on the surface of the camera lens or a relative transparency or clarity of the lens. If the dirtiness of the camera lens exceeds a predetermined threshold, at step 930, camera protection and cleaning system 400,500,600 may be configured to initiate a predetermined cleaning cycle of the camera lens. In such instances, the cycle may include a predetermined cleaning sequence, a predetermined period of time of operation, or both.

In any embodiment, if one or more vehicle camera lenses is not cleanable to a desired level due to an excessive amount or type of debris, one or more electronic control units connected to or associated with camera protection and cleaning system 400,500,600 may be configured to digitally process the acquired images or video to enhance the quality of the resulting images or video and/or to exclude such debris from the resulting images and video that is displayed to the driver. In addition, camera protection and cleaning system 400,500,600 may be configured to detect whether shades 450 or covers 510,610 are jammed or not in their expected position when commanded to move and to provide a message the driver accordingly. Camera protection and cleaning system 400,500,600 may also be configured to detect environmental conditions, such as sandstorms and the like, and provide a message to the driver not to open or close (as the case may be) shades 450 or covers 510,610.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:

1. A vehicle camera protection and cleaning system comprising a camera cover, the camera cover comprising:
   an inner ring fixedly attached to an underside surface of the cover; and
   a plurality of aperture members pivotally connected to the inner ring on one end and pivotally connected on another end to an outer ring that is movable relative to the inner ring, wherein at least one of the plurality of aperture members comprises a wiper configured to clean a lens of a camera when the aperture members are moved over the lens.

2. The system of claim 1, wherein the wiper comprises a brush.

3. The system of claim 1, wherein the wiper comprises a plastic or a rubber.

4. The system of claim 1, wherein the wiper comprises a plurality of wiping elements configured to sweep across the lens of the camera.

5. The system of claim 1, comprising a controller including a processor and memory configured to control movement of the aperture members to clean the camera lens.

6. The system of claim 5, wherein the controller controls the movement of the aperture members over a predetermined period of time.

7. The system of claim 5, wherein the controller controls the movement of the aperture members in a predetermined cycle.

8. The system of claim 1, wherein the aperture members are positioned side by side along a circumference of the inner ring.

9. The system of claim 1, comprising a motor configured to rotate the outer ring.

10. A vehicle camera protection and cleaning system comprising a camera cover, the system comprising:
- a motor connected to the cover, the motor configured to rotate the cover in a circular manner;
- an aperture defined by a plurality of walls in the cover, the aperture configured to provide an opening for a camera for viewing a vicinity around a vehicle; and
- a plurality of wipers positioned on an underside surface of the cover, the wipers configured to clean a lens of the camera when the cover is moved over the lens.

11. The system of claim 10, wherein the wiper comprises a brush.

12. The system of claim 10, wherein the wiper comprises a plastic or a rubber.

13. The system of claim 10, wherein the wiper comprises a plurality of wiping elements configured to sweep across the lens of the camera.

14. The system of claim 10, comprising a controller including a processor and memory configured to control movement of the cover over the camera lens.

15. The system of claim 14, wherein the controller controls the movement of the cover over a predetermined period of time.

16. The system of claim 14, wherein the controller controls the movement of the cover in a predetermined cycle.

17. A vehicle camera protection and cleaning system comprising a camera cover, the system comprising:
- a motor connected to the cover, the motor configured to translate the cover over a camera lens;
- at least one wiper positioned on an underside surface of the cover, the at least one wiper configured to clean the lens of a camera when the cover is translated over the lens; and
- a controller including a processor and memory connected to the motor, the controller configured to control the movement of the cover over the camera lens.

18. The system of claim 17, wherein the wiper comprises a brush.

19. The system of claim 17, wherein the wiper comprises a plastic or a rubber.

20. The system of claim 17, wherein the wiper comprises a plurality of wiping elements configured to sweep across the lens of the camera.

* * * * *